US007164932B1

(12) United States Patent
Sato et al.

(10) Patent No.: US 7,164,932 B1

(45) Date of Patent: Jan. 16, 2007

(54) MILLIMETER BAND SIGNAL TRANSMITTING/RECEIVING SYSTEM HAVING FUNCTION OF TRANSMITTING/RECEIVING MILLIMETER BAND SIGNAL AND HOUSE PROVIDED WITH THE SAME

(75) Inventors: Hiroya Sato, Nara (JP); Eiji Suematsu, Nara (JP); Yoshihisa Amano, Nara (JP); Tamotsu Aoki, Tochigi (JP); Yoshinori Seki, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/400,974

(22) Filed: Sep. 22, 1999

(30) Foreign Application Priority Data

Sep. 22, 1998 (JP) ................................ 10-267517
Sep. 6, 1999 (JP) ................................ 11-251730

(51) Int. Cl.
*H04M 1/00* (2006.01)

(52) U.S. Cl. ................................ 455/562.1; 455/67.11; 455/277.2; 455/561; 348/614; 348/607; 343/907

(58) Field of Classification Search ................. 455/63, 455/503, 277.1, 277.2, 278.1, 65, 62, 67.6, 455/63.1–63.4, 67.16, 560, 562.1, 561, 101, 455/67.11, 67.13, 517, 296, 226.1, 132, 269, 455/272; 342/70, 372; 359/271; 348/614, 348/607, 612; 343/907, 725, 757
See application file for complete search history.

(56) References Cited

U.S. PATENT DOCUMENTS 4,257,048 A * 3/1981 Yokoi et al. ................ 343/725
4,301,530 A * 11/1981 Gutleber .................. 455/226.1
4,939,523 A * 7/1990 Jehle et al. ................. 343/757
5,045,945 A * 9/1991 Herman et al. ............. 348/614
5,095,535 A * 3/1992 Freeburg .................... 455/278
5,128,755 A * 7/1992 Fancher ....................... 348/607
5,355,520 A * 10/1994 Freeburg et al. ........... 455/53.1
5,450,615 A * 9/1995 Fortune et al. .......... 455/67.16
5,479,443 A * 12/1995 Kagami et al. ............. 375/211
5,584,047 A * 12/1996 Tuck .......................... 455/561
5,585,803 A * 12/1996 Miura et al. ................ 342/372
5,654,715 A * 8/1997 Hayashikura et al. ......... 342/70
5,689,812 A * 11/1997 Takahashi .................. 455/67.6
5,712,602 A 1/1998 Suematsu
5,860,057 A * 1/1999 Ishida et al. ............. 455/277.2
5,920,813 A * 7/1999 Evans et al. ................ 455/422
5,926,768 A * 7/1999 Lewiner et al. ............. 455/456

(Continued)

FOREIGN PATENT DOCUMENTS

JP 60-144029 A 7/1985

(Continued)

OTHER PUBLICATIONS

William Stanley, Electronic Communications Systems, 1982, Reston Publishing Company, pp. 513-517.*

(Continued)

*Primary Examiner*—Lana Le
(74) *Attorney, Agent, or Firm*—Birch, Stewart, Kolasch & Birch, LLP

(57) ABSTRACT

A millimeter band transmitter transmits one or more indirect path signal waves from the main lobe of a transmit antenna, and a direct path signal wave is transmitted in a side lobe of the transmit antenna. A receiver simultaneously receives each of the indirect and direct path signal waves if the receive antenna is unobstructed. If the direct line of sight path between the transmitter and receiver is blocked, the receiver only receives one or more of the indirect path signal waves.

48 Claims, 9 Drawing Sheets

U.S. PATENT DOCUMENTS

| | | | | |
|---|---|---|---|---|
| 6,128,486 | A * | 10/2000 | Keskitalo et al. | 455/422 |
| 6,175,811 | B1 * | 1/2001 | Tekinay | 702/71 |
| 6,200,266 | B1 * | 3/2001 | Shokrollahi et al. | 455/272 |
| 6,249,321 | B1 * | 6/2001 | Bae et al. | 348/614 |
| 6,249,680 | B1 * | 6/2001 | Wax et al. | 455/456 |
| 6,301,470 | B1 * | 10/2001 | Brunner et al. | 375/347 |
| 6,304,514 | B1 * | 10/2001 | Schulze | 367/87 |
| 6,338,031 | B1 * | 1/2002 | Lee et al. | 703/13 |
| 6,393,303 | B1 * | 5/2002 | Katz | 455/562.1 |
| 6,449,461 | B1 * | 9/2002 | Otten | 455/63.1 |
| 6,529,310 | B1 * | 3/2003 | Huibers et al. | 359/291 |
| 6,611,696 | B1 * | 8/2003 | Chedester et al. | 455/562.1 |
| 6,643,526 | B1 * | 11/2003 | Katz | 455/562.1 |
| 2004/0022175 | A1 * | 2/2004 | Bolinth et al. | 370/203 |

FOREIGN PATENT DOCUMENTS

| | | | |
|---|---|---|---|
| JP | 03-053624 | A | 3/1991 |
| JP | 08-084107 | A | 3/1996 |
| JP | 8-288901 | A | 11/1996 |
| JP | 09-298501 | A | 11/1997 |
| JP | 10-107711 | A | 4/1998 |

OTHER PUBLICATIONS

Stanley, William, Electronic Communications Systems, 1982, 10th edition, pp. 513-514.*

T. Manabe, MWE '96 Microwave Workshop Digest, pp. 501-510.

Japanese Office Action, Mar. 9, 2004 with English translation.

Best, Dr. Steven R., (1998) Antenna Properties and their impact on Wireless System Performance, 1998 Cushcraft Corporation, pp. 1-19.

Manabe, Takeshi et al., Effect of Antenna Directivity and Polarization on Indoor Multipath Propagation Characteristics at 60 GHz, (Apr. 1996), IEEE Journal on Selected Areas in Communications, vol. 14, No. 3, pp. 441-448.

Federal Communications, Office of Engineering and Technology, Millimeter Wave Propagation: Spectrum Management Implications (Jul. 1997), Bulletin No. 70, pp. i and 1-24.

* cited by examiner

MILLIMETER BAND SIGNAL TRANSMITTING/RECEIVING SYSTEM HAVING FUNCTION OF TRANSMITTING/RECEIVING MILLIMETER BAND SIGNAL AND HOUSE PROVIDED WITH THE SAME

BACKGROUND OF THE INVENTION

1. Field of the Invention

The present invention relates to millimeter band signal transmitting/receiving systems and houses provided with the same, and more specifically to a millimeter band signal transmitting/receiving system for indoor transmission of a video signal using a millimeter-wave and a house provided with the same.

2. Description of the Background Art

In millimeter-wave communication, if a path between a transmitter and receiver is obstructed by an object such as a human body, propagation of a direct wave traveling along a propagation path between the transmitter and receiver (hereinafter referred to as a line of sight) is interrupted as the millimeter-wave is absorbed by the object. It is a major concern in the millimeter-wave communication to ensure good communication even when the propagation path is obstructed by such object.

One attempt which has been made to ensure good reception with the line of sight obstructed is to provide the transmitter near the ceiling and to provide the receiver such that the propagation path is not obstructed by the object (that is, only direct wave is used). However, such approach is not actually practical in a general house particularly with many objects because of positional limitations of the transmitter and receiver.

Another approach relates to path diversity by a change in directivity of a terminal station antenna, macro diversity among a plurality of base stations or the like, as disclosed in "Fundamentals of Millimeter-wave Propagation" by Takeshi Manabe, in MWE '96 Microwave Workshop Digest, pp. 501–510. However, any of these approaches relates to a structure based on a fundamental that "one radiowave path is selectively used at a time and a plurality of radiowave paths are not simultaneously used" for transmission/reception of information apart from monitoring for the purpose of control. Thus, a system tends to be more complicated and requires a higher cost.

Therefore, the present invention is made to solve the aforementioned problem. An object of the present invention is to provide a millimeter band signal transmitting/receiving system for surely performing millimeter-wave communication with an extremely low cost and a simple method.

SUMMARY OF THE INVENTION

According to one aspect of the present invention, a millimeter band signal transmitting/receiving system includes a transmitter transmitting a signal wave with a millimeter band a propagation path forming portion forming at least one propagation path for propagation of the signal wave, and a receiver simultaneously receiving a plurality of signal waves through the plurality of propagation paths of a line of sight propagation path and at least one propagation path.

Therefore, according to the millimeter band signal transmitting/receiving system, the signal waves with millimeter bands can be transmitted/received through the plurality of propagation paths, so that good transmission/reception is achieved.

Preferably, propagation path forming portion includes a reflector arranged to reflect the signal wave from the transmitter and receives the signal wave reflected by the transmitter.

Therefore, according to the millimeter band signal transmitting/receiving system, the plurality of propagation paths are ensured by the reflector. In addition, the arrangement of the reflector allows a condition that the plurality of signal waves enter the receiver to readily be set.

Particularly with the provision of the reflector, a condition for transmitting the plurality of signal waves to the receiver can readily be set.

Preferably, the reflector is arranged to substantially almost in parallel to an imaginary line between the transmitter and receiver.

Therefore, according to the millimeter band signal transmitting/receiving system, angular apertures for antennas of the transmitter and receiver can be small. In addition, such arrangement satisfies a condition that the plurality of signal waves enter the receiver with higher intensity.

Preferably, the reflector has a thin film including aluminum.

Therefore, when an aluminum foil is used, for example, the plurality of propagation paths can readily be obtained as it is a good reflector for the millimeter band signal, high in workability and low in cost.

Preferably, the reflector has its surface covered by an insulating material.

Thus, as the reflector has its surface covered by the insulating material, it is also used as a decoration, thereby increasing fanciness of the house. Further, the insulating material effectively protects the surface of the reflector.

Preferably, the reflector has its surface covered by a transparent insulating material.

Thus, the reflector can also be used as a mirror for reflecting a light. As a result, fanciness of the house is increased and the insulating material effectively protects the surface of the reflector. In addition, positioning and orientation of the millimeter band signal transmitting/receiving system are facilitated by visual verification in setting the reflector.

Preferably, a plurality of reflectors are arranged, forming a plurality of propagation paths propagating signal waves for the receiver.

Therefore, even if a line of sight between the transmitter and receiver is obstructed, good transmission/reception is achieved by the propagation path other than the line of sight. It is noted that the signal wave may be reflected by the reflector once or more that once.

Particularly, the receiver always simultaneously receives the plurality of signal waves from the plurality of propagation paths in a normal state.

Therefore, receiver always receives the signal waves with a plurality of millimeter bands through the plurality of propagation paths, so that good transmission/reception is achieved when there is not an obstruction (in the normal state). Even if there is an obstruction, good transmission/reception is achieved by another propagation path.

The transmitter and receiver are provided inside a house, and the propagation path forming portion is a structural component defining an internal space of the house and reflecting the signal wave transmitted from the transmitter. The transmitter is spaced by a prescribed distance from the structural component defining the internal space of the house for transmitting the signal wave with the millimeter band at a transmission angle of at least a prescribed value.

Therefore, according to the millimeter band signal transmitting/receiving system, a plurality of propagation paths are ensured for propagation of the signal waves while utilizing the component of the house in which the transmitter and receiver are provided. As a result, good transmission/reception is achieved.

Preferably, each of the above mentioned prescribed distance and the transmission angle of at least the prescribed value is determined by a region through which the plurality of signal waves propagate and a positional relation between the transmitter and the receiver.

Therefore, according to the millimeter band signal transmitting/receiving system, a position of the transmitter or the transmission angle can suitably be set based on the region for propagation of the plurality of signal waves and the positional relation between the transmitter and the receiver. Thus, the propagation path for the signal wave is efficiently provided with a minimum output. In addition, the problem associated with a decrease in a transmission quality due to interruption of the line of sight between the transmitter and receiver is eliminated.

According to still another aspect of the present invention, a millimeter band signal transmitting/receiving system includes a plurality of transmitters for millimeter bands and a receiver arranged to simultaneously receive the plurality of signal waves transmitted from the plurality of transmitters. A plurality of signal waves transmitted from the plurality of transmitters have the same frequency.

Therefore, according to the millimeter band signal transmitting/receiving system, good transmission/reception is achieved using the plurality of propagation paths. Particularly, the system can cope with the problem associated with the interruption of the line of sight using the same frequency band, that is, without increasing an occupied bandwidth.

Preferably, each of the plurality of transmitters includes a local oscillator oscillating at a local oscillator frequency for generating a signal wave at the same frequency.

Therefore, according to the millimeter band signal transmitting/receiving system, the frequency of the signal waves are all the same, so that the system can cope with the problem associated with the interruption of the line of sight using the same frequency band.

Preferably, the local oscillators are in synchronization with each other.

Therefore, according to the millimeter band signal transmitting/receiving system, the plurality of signal waves all match, so that a bit noise is not generated by a difference in the local oscillator frequencies. Further, contents in the same channel are transmitted completely at the same frequencies, and therefore a reduction in the quality by the difference in frequencies is prevented.

It is noted that there is not any problem in ensuring a plurality of propagation paths by arranging a reflector reflecting the signal wave in the millimeter band signal transmitting/receiving system.

Particularly, the receiver always simultaneously receives the plurality of signal waves from the plurality of propagation paths in a normal state.

Therefore, receiver always receives the signal waves with a plurality of millimeter bands through the plurality of propagation paths, so that good transmission/reception is achieved when there is not an obstruction (in the normal state). Even if there is an obstruction, good transmission/reception is achieved by another propagation path.

According to still another aspect of the present invention, a house provided with a millimeter band signal transmitting/receiving system includes a structural component defining an internal space of the house and the millimeter band signal transmitting/receiving system. The millimeter band signal transmitting/receiving system includes a transmitter transmitting a signal wave with a millimeter band, a propagation path forming portion arranged in the structural component and forming at least one propagation path for propagation of signal wave, and a receiver simultaneously receiving the plurality of signal waves through the plurality of propagation paths of a line of sight propagation path between the receiver and the transmitter and at least one propagation path.

Therefore, according to the house provided with the millimeter band signal transmitting/receiving system, the plurality of propagation paths for propagation of signal waves can be ensured utilizing the component of the house in which the transmitter and receiver are provided, so that good transmission/reception is achieved.

Preferably, the propagation path forming portion includes a reflector reflecting the output from the transmitter. The reflector is arranged on a surface of the component.

Therefore, according to the house provided with the millimeter band signal transmitting/receiving system, the reflector can more readily be arranged with respect to the transmitter/receiver provided in the house, depending on the internal arrangement of the house.

Preferably, the reflector is arranged inside the component.

Therefore, according to the house provided with the millimeter band signal transmitting/receiving system, even when the reflector cannot be arranged in the house with respect to the transmitter/receiver provided in the house, good transmission/reception is achieved by arranging the reflector inside the component.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
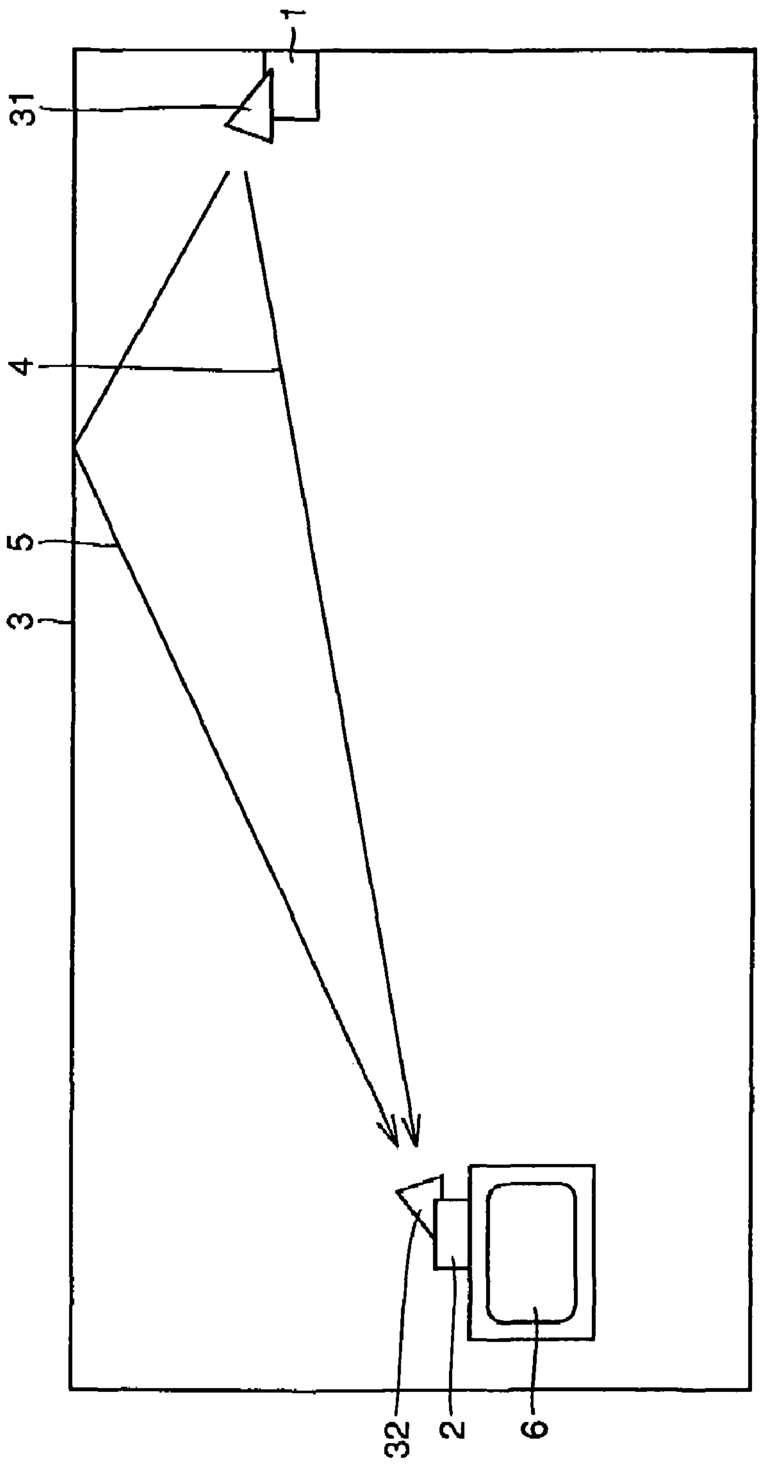
FIG. 1 is a side view showing a house provided with a millimeter band signal transmitting/receiving system according to a first embodiment of the present invention.

Embodiments of the present invention will now be described in detail with reference to the drawings. It is noted that the same or corresponding portions in the drawings are denoted by the same reference numerals and description thereof will not be repeated.

First Embodiment

An arrangement of the first embodiment of the present invention will be described reference to FIG. 1. FIG. 1 is a side view showing a house provided with a millimeter band signal transmitting/receiving system according to the first embodiment of the present invention.

Shown in FIG. 1 are: a transmitter 1 for transmitting a millimeter-wave video signal; a receiver 2; a ceiling 3 as an example of a structural component defining an internal space of the house; a display (a television or the like) 6 for display of the video signal received by receiver 2: an antenna 31 of transmitter 1; and an antenna 32 of receiver 2.

Ceiling 3 includes a gypsum board. An aperture beam angle for antenna 31 of transmitter 1 is ±30°, and an incident angle from transmitter 1 to ceiling 3 is 70°. Ceiling 3 reflects an output from transmitter 1. In a normal state with no obstruction, a direct wave 4 from transmitter 1 and a reflected wave 5 reflected by ceiling 3 are simultaneously received by antenna 32 of receiver 2.

The aperture beam angle for antenna 32 of receiver 2 is ±15°, and an intensity of reflected wave 5 is about +3 dB with respect to direct wave 4. It is noted that a horizontal distance H between transmitter 1 and receiver 2 is 5 m, a height from a floor surface to transmitter 1 (or antenna 31) is 2 m, and a height from the floor surface to receiver 2 (or antenna 32) is 0.6 m.

In the application of an indoor wireless LAN (Local Area Network) (transmission/reception is performed by the direct wave), which relates to the conventional usage of a millimeter-wave, a satisfactory communication is not obtained because of a serious affect of multiple paths when two waves are simultaneously received.

However, in the above described arrangement shown in FIG. 1, the experimental transmission of the video signal using a BS (Broadcasting Satellite)/CS (Communications Satellite) signal with 60 GHz band did not produce any adverse affect such as a ghost caused by the multiple paths. Thus, it is proved that a video signal passes without any problem.

Figure 2:
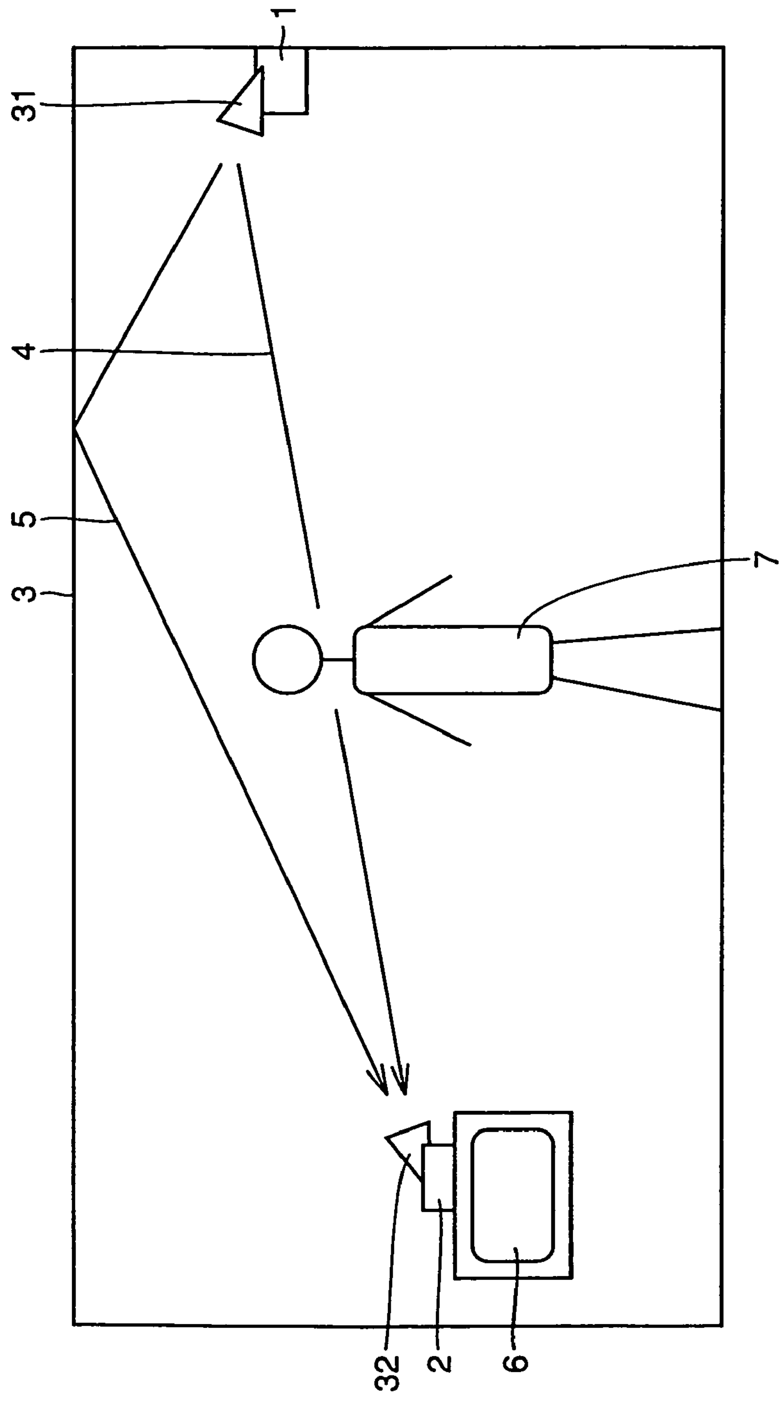
FIG. 2 is a view shown in conjunction with the case where a direct wave is interrupted by a human body 7 in the arrangement shown in FIG. 1.

FIG. 2 is in conjunction with the case where the above mentioned direct wave 4 is interrupted by a human body 7. In this case, although the video signal decrease by about 15 dB in intensity, the intensity of the signal was still sufficient to prevent distortion of image. This is because the video signal is propagated by reflected wave 5, which has been reflected by ceiling 3.

Further, direct wave 4 was intentionally interrupted by a metal reflector instead of the human body. As a result, distortion of the image was not seen as in the case of the human body.

It is noted that the intensity of direct wave 4 with respect to reflected wave 5 tends to fall within a suitable range if reflected wave 5 and direct wave 4 are a main lobe and a side lobe of the transmitting/receiving antenna, respectively. In addition, the intensities of reflected wave 5 and direct wave 4 preferably satisfy the following relation (1).

$$\text{(intensity of reflected wave} - 3\text{ dB)} \geqq \text{(intensity of direct wave)} > \text{minimum sensitivity of communication system} \quad (1)$$

As the transmitter and receiver are provided such that the direct wave and the reflected wave along the reflected path are simultaneously received by the receiver, even when the propagation path of the direct wave is obstructed, good reception of the video signal is achieved.

Second Embodiment

Figure 3:
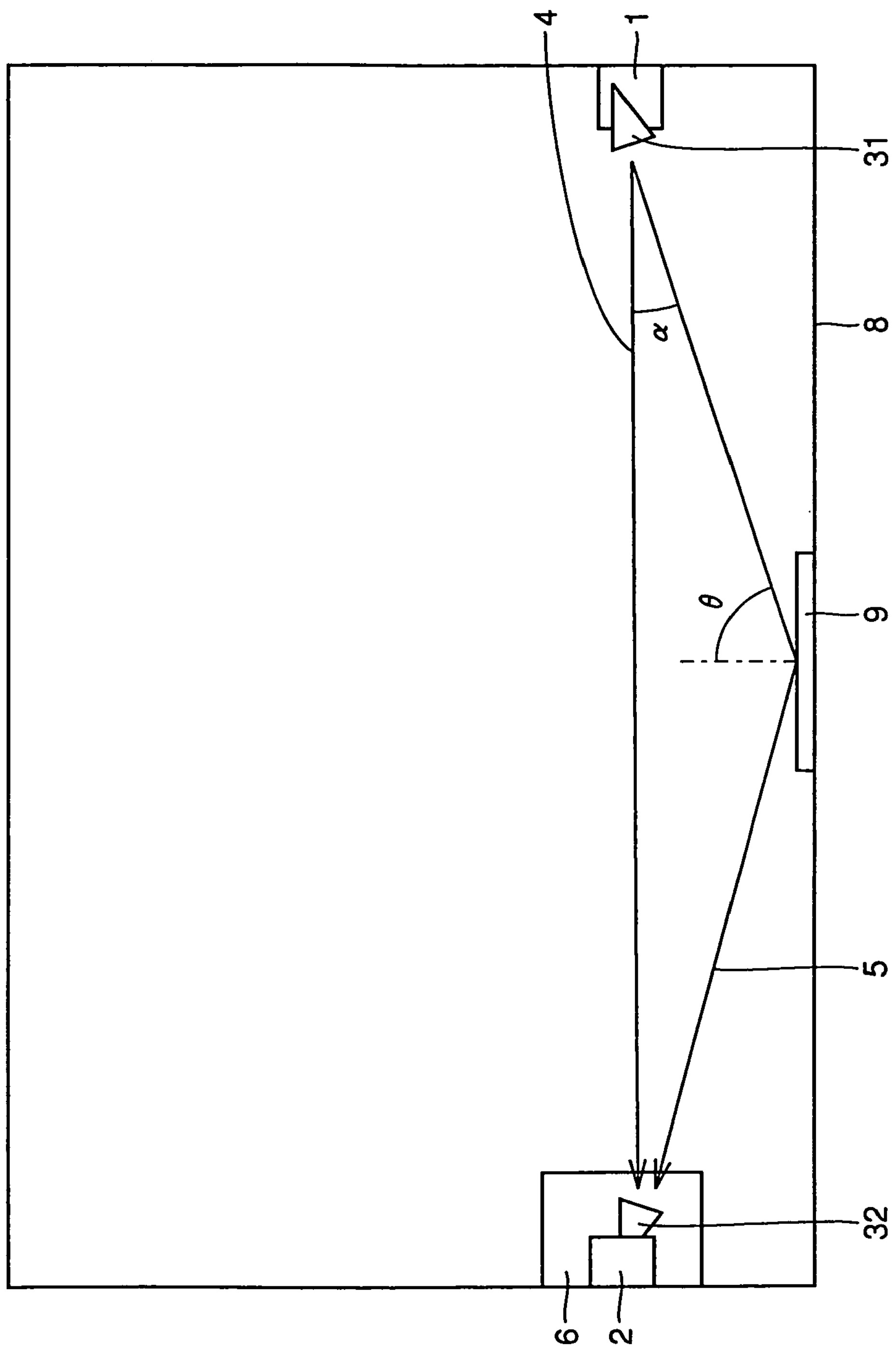
FIG. 3 is a plan view of the house provided with a millimeter band signal transmitting/receiving system according to a second embodiment of the present invention.

An arrangement according to a second embodiment of the present invention will be described with reference to FIG. 3. FIG. 3 is a plan view (a view when seen from the ceiling) of a house provided with a millimeter band signal transmitting/receiving system according to the second embodiment of the present invention.

Shown in FIG. 3 is a wall surface 8 as an example of a structural component defining an internal space of the house. Wall surface 8 is provided with a reflector 9. A back surface (a surface facing the wall surface of the house) of reflector 9 is covered by a material (for example, an aluminum foil) reflecting a millimeter band signal.

For example, a picture having on its back surface an aluminum foil is used as reflector 9. As the aluminum foil is applied to the back surface of the picture, reflection of the video signal with the millimeter band is achieved without impairing an appearance of the house.

As in the first embodiment, also in the second embodiment of the present invention, two waves in total, that is, direct wave 4 and reflected wave 5 via reflector 9 (the aluminum foil applied to the back surface of the picture), are simultaneously received by antenna 32 of receiver 2 in the normal state with no obstruction.

Reflector 9 is arranged substantially almost in parallel to an imaginary line between transmitter 1 and receiver 2. Thus, angular apertures for antennas 31 and 32, respectively of transmitter 1 and receiver 2, can be small. The angular aperture for antenna 31 of transmitter 1 corresponds to a (actually an angle slightly greater than a) shown in FIG. 3. As a result, a gain of the antenna is increased, so that reflected wave 5 is more appropriately received by antenna 32 of receiver 2.

The aluminum foil is not necessarily flat like a mirror. When an incident angle θ to reflector 9 is 60°, if a magnitude of a surface roughness is about 1.2 mm, that is, at most ¼ wavelength at 60 GHz, the aluminum foil can serve as a reflector without any problem. Further, an experiment has proved that any surface roughness d satisfying the following relation (2) is practically appropriate.

$$d < \lambda/(8 \cos \theta) \quad (2)$$

As in the case of the first embodiment, a good image is obtained regardless of whether there is an obstruction (such as a human body) on the propagation path of direct wave 4.

It is noted that although reflector 9 having the picture on its surface and the aluminum foil on its back surface is used in the present embodiment, it is not limited to this. For example, reflector 9 may have a calendar or the like on its surface. Any material other than an absorber which particularly absorbs the millimeter band signal may be used, such as a sheet of paper, a thin piece of wood or the like.

Although not shown in the drawing, a good image is similarly obtained by using a mirror in place of the picture having the aluminum foil on its back surface. Therefore, reflector 9 may have its surface covered by a transparent insulating material. It is noted that glass, resin or the like can be used as the transparent insulating material. It is needless to say that the surface of the glass, resin or the like does not necessarily serve as a mirror.

In addition, a wire netting provided as the structural component inside the wall surface or a thermal insulator including an aluminum foil may be used as reflector 9.

Although not shown in the drawings, first and second embodiments of the present invention may be combined. More specifically, in the arrangement of the first embodiment, a reflector having an aluminum foil or the like is attached to the back surface of a ceiling board (a surface on the inner side is a main surface) of ceiling 3. A similar effect is also obtained with such arrangement. It is noted that there may be a space between the ceiling board and reflector 9.

As described above, the transmitter, receiver and reflector are arranged for the millimeter band signal and the plurality of propagation paths are provided, so that the millimeter band signal transmitting/receiving system capable of ensuring a stable communication path for the millimeter band signal (particularly a video signal) without impairing an appearance of the house using an extremely inexpensive and simple method.

In addition the provision of the plurality of propagation paths makes it possible to ensure a good transmission quality while avoiding the problem associated with a decrease in the transmission quality due to interruption of the line of sight in the indoor video transmission.

Third Embodiment

Figure 4:
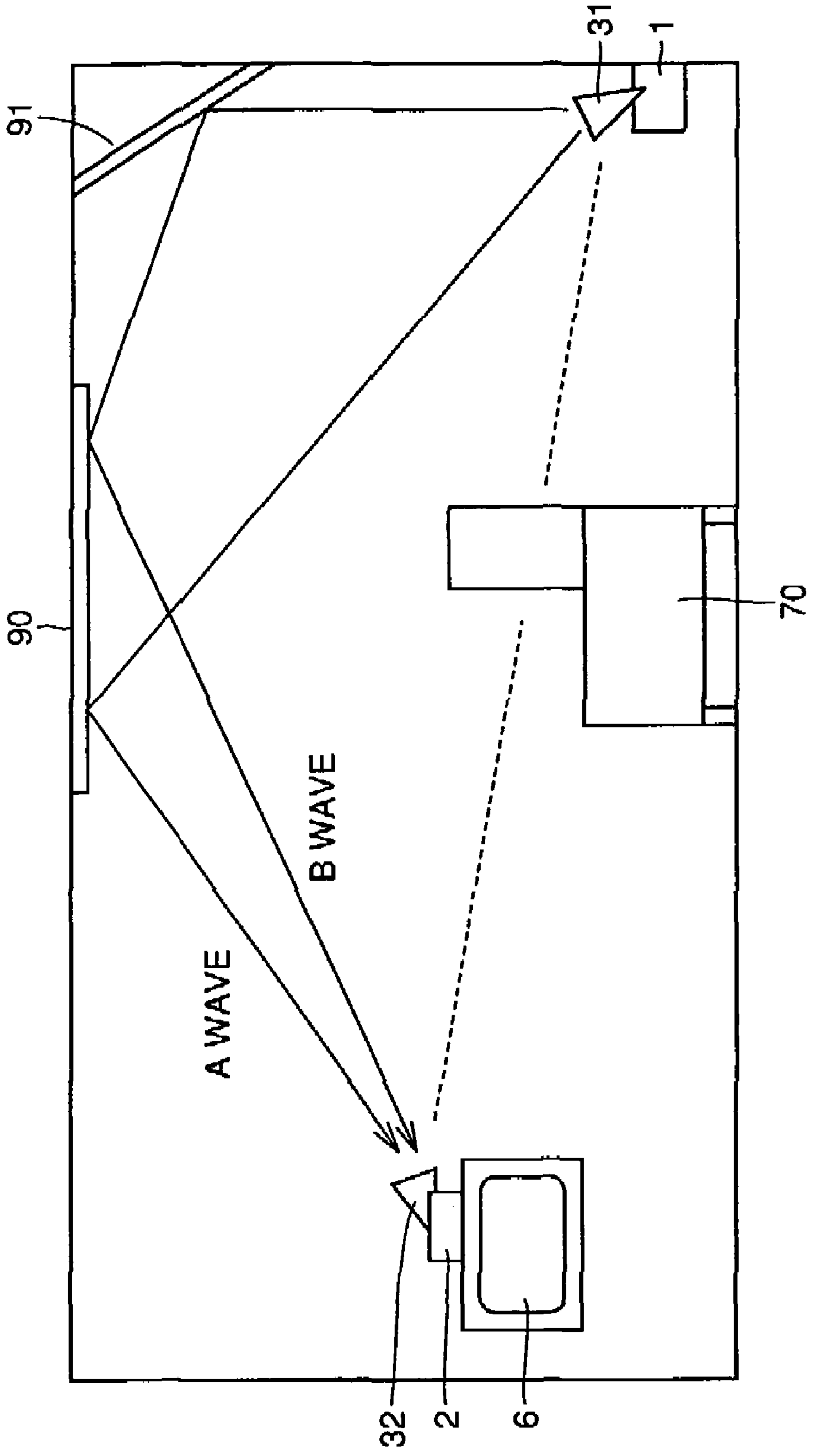
FIG. 4 is a side view showing a house provided with a millimeter band signal transmitting/receiving system according to a third embodiment of the present invention.

An arrangement of a third embodiment of the present invention will be described with reference to FIG. 4. FIG. 4 is a side view showing a house provided with a millimeter band signal transmitting/receiving system according to the third embodiment of the present invention.

Referring to FIG. 4, two reflectors 90 and 91 are provided in the house. Denoted by a reference numeral 70 is an obstruction, on a propagation path between transmitter 1 and receiver 2. A direct wave from transmitter 1 to receiver 2 is interrupted by obstruction 70.

Reflectors 90 and 91 reflect signal waves transmitted from transmitter 1. A wave, which is reflected by reflector 90, enters receiver 2. B wave reflected by reflectors 91 and 90 enters receiver 2. In other words, A and B waves simultaneously enter receiver 2.

As the signal waves transmitted by transmitter 1 enter receiver 2 through the plurality of propagation paths, good video reception is achieved while avoiding a problem associated with degradation of transmission quality die to an obstruction on the line of sight.

It is noted that although B wave is reflected by reflectors 91 and 90 in the third embodiment of the present invention, the B wave may be reflected only by reflector 91. Further, it is needless to say that more than two waves may simultaneously enter receiver 2.

In general houses, an antenna terminal for BS/CS or the like is in most cases provided in the lower portion of the room. Therefore, as shown in FIG. 4, the arrangement ensuring the plurality of propagation paths by arranging the reflector in the upper portion of the room (for example on the ceiling or on the upper portion of the wall surface) with respect to transmitter 1 provided in the lower portion of the room is very effective in the general house in which the antenna terminal for BS/CS or the like is provided in the lower portion of the room.

It is also effective if the A and B waves in the third embodiment of the present invention are main and side lobes of the antenna. With the use of the main and side lobes, a particular advantage is obtained that the antenna gains for both of the A and B waves are readily ensured as compared with the case where both of the A and B waves are the main lobes.

Fourth Embodiment

Figure 5:
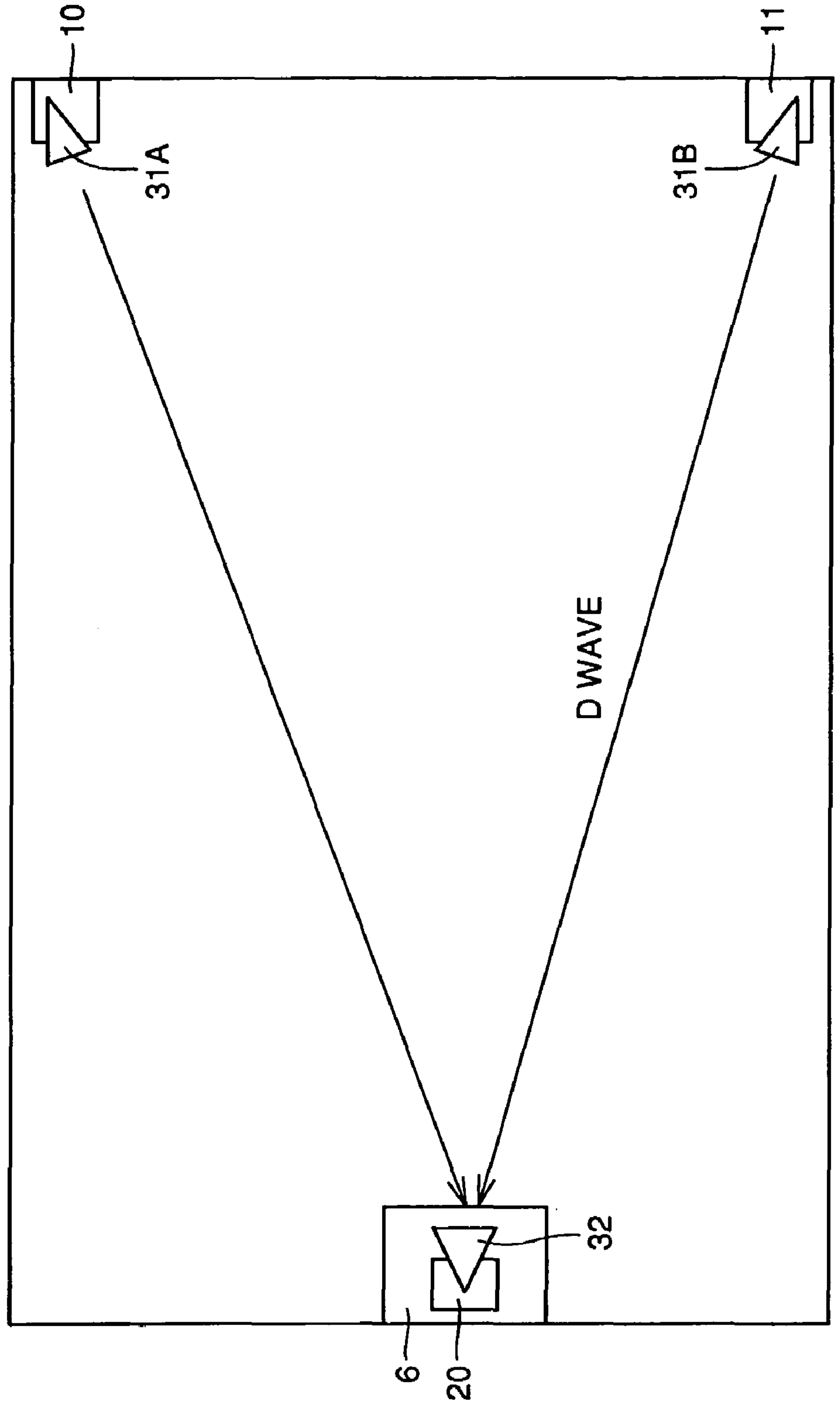
FIG. 5 is a plan view showing a house provided with a millimeter band signal transmitting/receiving system according to a fourth embodiment of the present invention.

An arrangement of a fourth embodiment for the present invention will now be described with reference to FIG. 5. FIG. 5 is a plan view showing a house provided with a millimeter band signal transmitting/receiving system according to the fourth embodiment of the present invention.

Referring to FIG. 5, two transmitters 10 and 11 for the millimeter band signal are provided in a house. Shown in FIG. 5 are: an antenna 31A of transmitter 10; an antenna 31B of transmitter 11; and an antenna 32 of a receiver 20. As shown in the drawing, C and D waves are respectively transmitted from transmitters 10 and 11. The C and D waves simultaneously enter receiver 20. Both of the C and D waves are direct waves.

Here, frequencies of the C and D waves are the same. For example, local oscillator frequencies for transmitters 10 and 11 are the same. Each of transmitters 10 and 11 combines a video signal and a signal at the local oscillator frequency for transmission. Thus, the frequencies of the C and D waves are the same. The same frequency bands are used to prevent interruption.

When a plurality of transmitters are arranged and the local oscillator frequencies thereof are the same, the frequencies can effectively be used as an occupied bandwidth does not increase at all as compared with the case of a frequency diversity or the like using different local oscillator frequencies.

The arrangement according to the fourth embodiment is characterized in that the above mentioned reflector or the like is not required. In general houses, recently, a plurality of antenna terminals for BS/CS or the like are provided in a room or in several rooms on the same floor. The fourth embodiment of the present invention is very effective for the arrangement of the transmitting/receiving system in such house.

Fifth Embodiment

Figure 6:
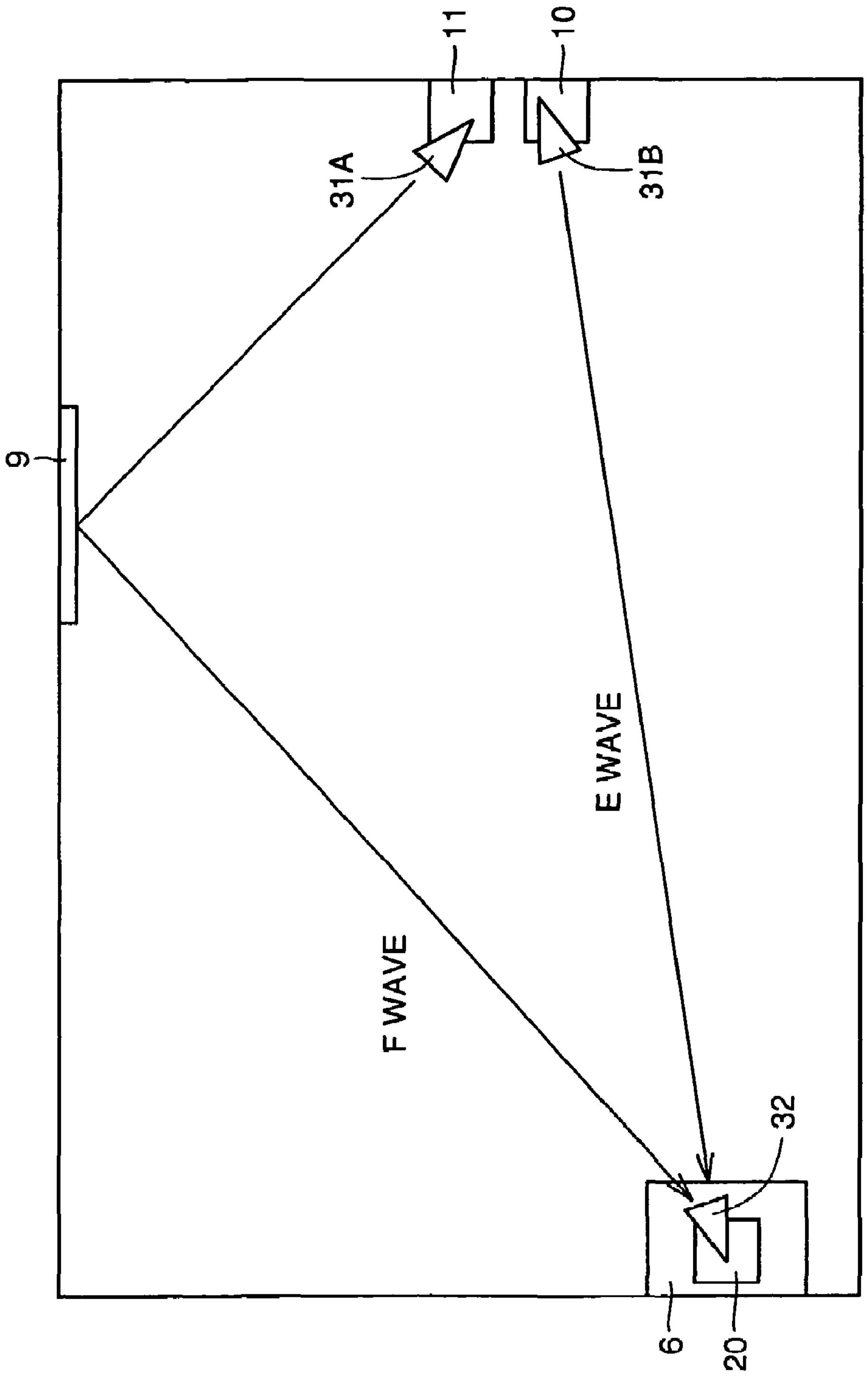
FIG. 6 is a plan view showing a house provided with a millimeter band signal transmitting/receiving system according to a fifth embodiment of the present invention.

An arrangement of the fifth embodiment of the present invention will be described with reference to FIG. 6. FIG. 6 is a plan view showing a house provided with a millimeter band signal transmitting/receiving system according to a fifth embodiment of the present invention.

Referring to FIG. 6, transmitters 10 and 11 are arranged adjacent to each other. Local oscillator frequencies for transmitters 10 and 11 are the same.

In the normal state with no obstruction, E wave which is a direct wave transmitted by transmitter 10 and F wave transmitted by transmitter 11 and reflected by reflector 9 are simultaneously received by receiver 20.

In this case, as the frequencies of the E and F waves are the same, a good image with less image distortion is obtained.

In the above described fourth embodiment, as different local oscillators are used for transmitters 10 and 11, the image quality is degraded if there is a difference in the frequencies of the C and D waves due to a change in the condition such as a frequency temperature. However, in the fifth embodiment of the present invention, the degradation of the image quality is effectively prevented.

For example, the frequencies can be made totally the same by using the same local oscillator for transmitters 10 and 11. Alternatively, each transmitter may be provided with a separate local oscillator and achieve a synchronous operation in accordance with any of the following methods. These methods include ① transmission/reception of outputs from the transmitters, ② transmission/reception of a PLL control signal for a stabilized operation of the local oscillators, and ③ reception of a transmission signal from a first transmitter (10 or 11) by the second transmitter (11 or 10) for synchronization.

It is noted that the arrangement according to the fifth embodiment of the present invention is very effective for freely covering a service area by a plurality of transmitters in accordance with an angular beam aperture of the antenna or the setting location.

Sixth Embodiment

Figure 7:
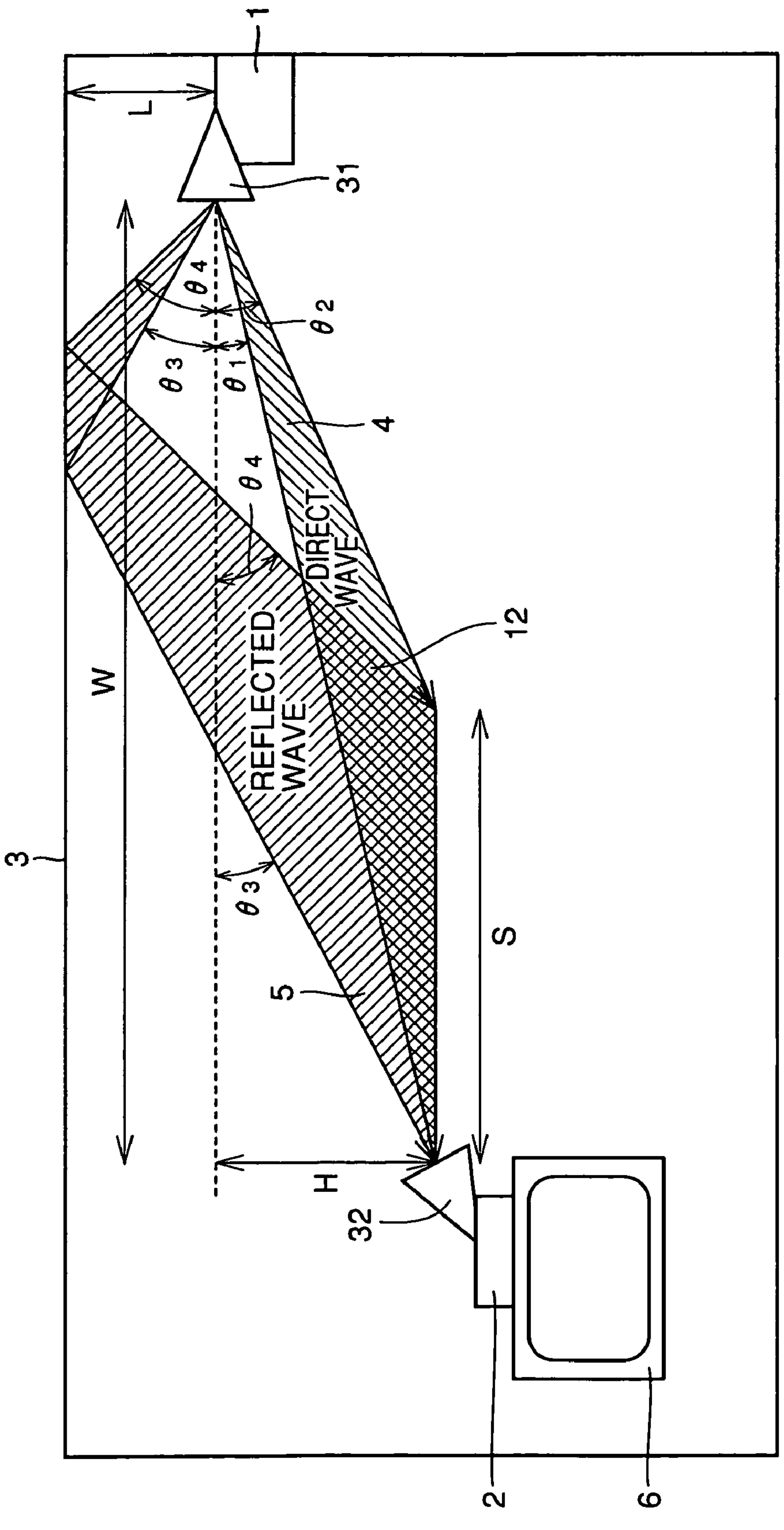
FIG. 7 is a side view showing a house provided with a millimeter band signal transmitting/receiving system according to a sixth embodiment of the present invention.

An arrangement of a sixth embodiment of the present invention will be described with reference to FIG. 7. FIG. 7 is a side view showing a house provided with a millimeter band signal transmitting/receiving system according to the sixth embodiment of the present invention.

FIG. 7 shows basically the same arrangement as that shown in FIG. 1. Here, the relation between a position or transmission angle for an antenna 31 of transmitter 1 and a region at which a direct wave and a reflected wave arrive will be described in detail.

Referring to FIG. 7, transmitter 1 is arranged in a position spaced from a ceiling 3 by a distance L, whereas a transmitter 2 provided in a television 6, which is a display unit, is arranged in a position spaced from transmitter 1 by a horizontal distance W and a vertical distance H.

As shown by a dotted line, a center of transmission from antenna 31 of transmitter 1 is approximately in a horizontal direction. It is noted that the center of transmission is not limited to the horizontal direction and, depending on the situation, it may be upward (toward ceiling 3) or downward (toward the floor). Here, for simplicity of the description, the transmission angle is set with respect to the horizontal direction.

Angular components θ1 and θ2 shown in FIG. 7 corresponded to direct wave 4 transmitted from antenna 31 toward the floor. Direct wave 4 propagates through a region covered by transmission angles θ1 and θ2 with respect to the center of transmission from antenna 31. Direct wave 4 can directly be received by receiver 2.

A portion of the signal wave from transmitter 1 toward ceiling 3 is reflected by a structural component such as a gypsum board forming ceiling 3 and received by receiver 2 as a reflected wave 5. Angular components 03 and 04 shown in FIG. 7 correspond to the signal wave from antenna 31 toward ceiling 3 or reflected wave 5 reflected by ceiling 3. The signal wave from antenna 31 toward ceiling 3 propagates through a region covered by transmission angles θ3 and θ4 with respect to the center of transmission from antenna 31 and arrives at ceiling 3. Reflected wave 5 reflected by ceiling 3 propagates through a region covered by transmission angles θ3 and θ4 with respect to the center of transmission from antenna 31.

Both of direct wave 4 and reflected wave 5 arrive at a region 12 shown in FIG. 7. The arrangement of receiver 2 in such region 12 makes it possible to simultaneously receive direct wave 4 and reflected wave 5 by receiver 2 in the normal state with no obstruction.

Reflection of the millimeter band signal by ceiling 3 depends on a structural material forming ceiling 3. For example, if a gypsum board is used, about 90% of the signal is transmitted and about 10% is reflected. A propagation loss in this case is about 10 dB and, an experimental result shows that a sufficiently practical effect is obtained in the case where digital information for CS digital broadcasting or the like is transmitted by a millimeter-wave even with a general free space propagation loss.

A piece of wood is effective as ceiling 3 for reflection as it is high in reflectance. However, if the piece of wood includes moisture, the reflectance decreases because it absorbs the millimeter-wave.

Figure 8:
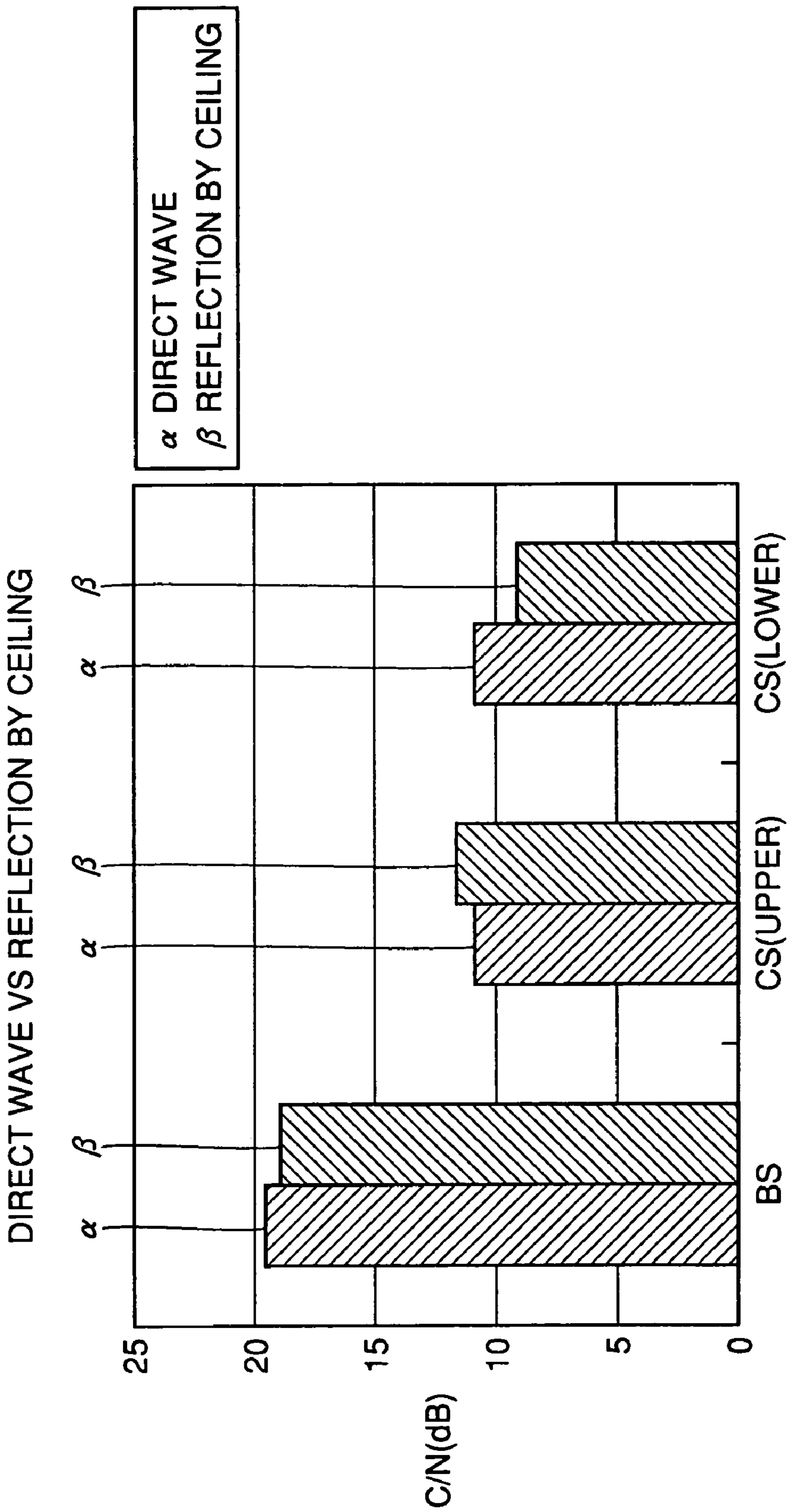
FIG. 8 is a graph showing an experimental result for a transmission quality according to the sixth embodiment of the present invention.

Here, an experimental result showing that reflection by the ceiling is effective for indoor millimeter-wave transmission will be described with reference to FIG. 8. FIG. 8 shows the experimental result for a transmission quality and shows that reflection by the ceiling is effective in the indoor millimeter-wave transmission. In the experiment, a material of the ceiling was a gypsum board, a piece of wood or the like, and a distance L from ceiling 3 to transmitter 1 was 1 m, a horizontal distance W between the transmitter and the receiver was 5 m, and a vertical distance H from transmitter 1 to receiver 2 was 2 m.

FIG. 8 shows data obtained by the experiment for reception C/N (a ratio of a carrier and a noise) in the case of the millimeter-wave transmission for BS broadcast (a symbol BS) and CS broadcast (a symbol CS), respectively for a reflected wave from the ceiling (with a transmission distance of about 6 m to 7 m) and a direct wave (with a transmission distance of about 5 m).

A ratio of carrier to noise C/N required for receiver 2 in the case of the millimeter band signal is at least 14 dB and 8 dB for BS broadcast and CS broadcast, respectively. A clear image is obtained with such C/N.

According to the experimental result shown in FIG. 8, the reflected wave from ceiling 3 and the direct wave both have C/N of at least 14 dB, at least 10 dB and at least 8 dB for BS broadcast, CS broadcast (UPPER) and CS broadcast (LOWER), respectively. Therefore, the experimental result shown in FIG. 8 shows that a sufficient transmission quality is ensured for both of the reflected wave from the ceiling and the direct wave.

Defining a horizontal distance of region 12 at which both of direct wave 4 and reflected wave 5 arrive as S, distances S, L, W, H and angles θ1 to θ4 must satisfy the following relations.

A condition that a lower end of direct wave 4 corresponds to a light end of region 12 at which both of direct wave 4 and reflected wave 5 arrive is specified in an equation (3). A condition that an upper end of direct wave 4 corresponds to a left end of region 12 at which both of direct wave 4 and reflected wave 5 arrive is specified in an equation (4).

$$W-S=H/\tan\theta 2 \quad (3)$$

$$W=H/\tan\theta 1 \quad (4)$$

Then, a condition that a lower end of reflected wave 5 corresponds to the right end of region 12 is specified in an equation (5). A condition that an upper end of reflected wave 5 corresponds to the left end of region 12 is specified in an equation (6).

$$W-S=2\times L/\tan\theta 4+H/\tan\theta 4 \quad (5)$$

$$W=2\times L/\tan\theta 3+H/\tan\theta 3 \quad (6)$$

The following relation is apparent from the conditions shown in the above equations (3) to (6). More specifically, assuming that a distance L from ceiling 3 to transmitter 1 is 0, if (W−S) and W are eliminated from equations (3), (5) and (4), (6), respectively, the following equation (7) is obtained.

$$\theta 2=\theta 4,\ \theta 1=\theta 3 \quad (7)$$

Equation (7) shows that direct wave 4 and reflected wave 5 propagate along the same path. More specifically, if direct wave 4 is interrupted by an obstruction such as a human body, reflected wave 5 is also interrupted as it is transmitted by the same path. In this case, an advantage from providing separate paths for direct wave 4 and reflected wave 5 is not obtained.

Therefore, to ensure direct wave 4 and reflected wave 5 by utilizing reflection by ceiling 3 to avoid the problem associated with the interruption, a distance L from ceiling 3 to transmitter 1 is essential.

This is also applied when the direct wave and the reflected wave are propagated along different paths by using a structural component (a wall surface) defining an internal space other than the ceiling. In utilizing reflection by the wall surface, transmitter 1 must be spaced by a prescribed distance from the wall surface.

Figure 9:
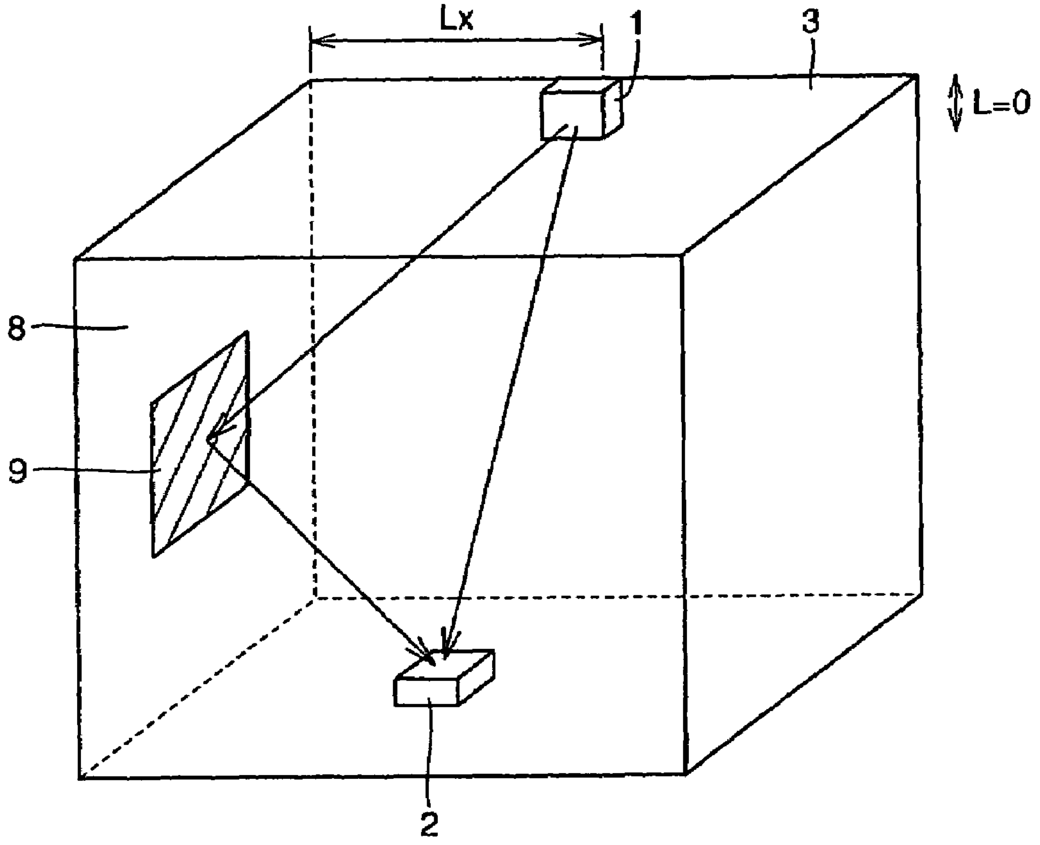
FIG. 9 is a view showing an exemplary arrangement of a millimeter band signal transmitting/receiving system when a reflector is used.

As shown in FIG. 9, for example, when the above described reflector is arranged on a wall surface 8 (or ceiling 3) so that an output from transmitter 1 is directed to receiver 2, distance L from ceiling 3 (or wall surface 8) to transmitter 1 may be 0. In this case, a distance Lx from wall surface 8 must be greater than 0 as shown in FIG. 9.

If reflection is restrictively performed only once by the ceiling, wall surface or floor, the millimeter band signal traveling within the region covered by transmission angles θ1 and θ3, respectively downward and upward with respect to the center of transmission from antenna 31 would not effectively arrive at receiver 2. Then, the reflected wave may be transmitted by a main and sub lobes as described above. Alternatively, two antennas are provided for separate transmission of the reflected wave and direct wave. If the center of transmission from antenna 31 of transmitter 1 is not horizontal, angles θ1 and θ3 are different. Thus, if an output is travelling within these angles, limitations on the mounting angle for the antenna is reduced.

In either case, to ensure region 12 at which both of the direct wave and the reflected wave arrive, transmission angles θ2 and θ4, respectively downward and upward with respect to the center of transmission, must be obtained. Of course, these angles must be determined depending on a required distance W, a width S of region 12 at which both of the direct wave and reflected wave arrive, a distance L from ceiling 3 to transmitter 1, a vertical distance H from transmitter 1 to receiver 2 or the like.

If these transmission angles are greater than θ2 and θ4 obtained from equations (3) to (6), the direct wave and reflected wave can travel in a larger region. Therefore, the transmission angles are desirably set greater than θ2 and θ4.

A reception angle for antenna 32 must be set at a prescribed value depending on these setting angles. More specifically, to allow reception of both of direct wave 4 and reflected wave 5 in any position within region 12 at which both of direct wave 4 and reflected wave 5 arrive, at least angle of (θ4−θ1) is required.

If distance W is 5 m, width S of region 12 at which direct wave 4 and reflected wave 5 arrive is 3 m, distance L from ceiling 3 to transmitter 1 is 1 m, and vertical distance H from transmitter 1 to receiver 2 is 1 m, the following relation for θ1 to θ4 is obtained from equations (3) to (6).

$$\theta 1\approx 11°,\ \theta 2\approx 27°,\ \theta 3\approx 31°,\ \theta 4\approx 56 \quad (8)$$

In other words, if angles θ1 to θ4 shown in equation (8) are increased by transmission angles for the antenna, a region at which both of the direct wave and reflected wave arrive is set at a position 2 m to 5 m away from transmitter 1.

As described above, according to the arrangement of the sixth embodiment of the present invention, the millimeter band signal transmitting/receiving system is provided which avoids the problem associated with the degradation of the transmission quality due to interruption of the line of sight between the transmitter and receiver as the reflected wave is received by the receiver while utilizing the structural component (the wall surface, ceiling or the like) forming the house.

In addition, the distance from the ceiling at which the transmitter is arranged or a transmission angle for the millimeter-wave outputs can suitably be set depending on a width of the room, height of the ceiling, and vertical and horizontal distances to the receiver. As a result, a plurality of propagation paths to the receiver is effectively obtained with a minimum transmission output. Therefore, a good image is produced while preventing degradation of the transmission quality due to interruption of the line of sight between the transmitter and receiver.

Although the present invention has been described and illustrated in detail, it is clearly understood that the same is by way of illustration and example only and is not to be taken by way of limitation, the spilit and scope of the present invention being limited only by the terms of the appended claims.

What is claimed is:

1. A millimeter band signal transmitting/receiving system, comprising:

a stationary transmitter transmitting a millimeter band signal wave;

a propagation path forming portion forming at least one indirect propagation path for propagation of said millimeter band signal wave; and a stationary receiver including a receive antenna having a main lobe and a side lobe receiving said millimeter band signal wave simultaneously from a plurality of propagation paths including a line of sight propagation path to said transmitter and said at least one indirect propagation path, and receiving said millimeter band signal wave from at least one of said plurality of propagation paths.

2. The millimeter band signal transmitting/receiving system according to claim 1, wherein said propagation path forming portion includes a reflector arranged to reflect said signal wave transmitted from said transmitter and direct said reflected signal wave to said receiver.

3. The millimeter band signal transmitting/receiving system according to claim 2, wherein said reflector is arranged substantially in parallel to a line of sight between said transmitter and said receiver.

4. The millimeter band signal transmitting/receiving system according to claim 2, wherein said reflector has a thin film including aluminum.

5. The millimeter band signal transmitting/receiving system according to claim 2, wherein said reflector has a surface covered by an insulating material.

6. The millimeter band signal transmitting/receiving system according to claim 2, wherein said reflector has a surface covered by a transparent insulating material.

7. The millimeter band signal transmitting/receiving system according to claim 2, wherein a plurality of said reflectors are arranged to form said plurality of propagation paths for propagating said signal waves to said receiver.

8. The millimeter band signal transmitting/receiving system according to claim 1, wherein said receiver always simultaneously receives said plurality of signal waves from said plurality of propagation paths in a normal state.

9. The millimeter band signal transmitting/receiving system according to claim 1, wherein said receiver and said transmitter are provided inside a house, said propagation path includes a structural component defining an internal space of said house and reflecting a signal wave transmitted from said transmitter, and said transmitter is spaced by a prescribed distance from said structural component defining said internal space of said house for transmitting said signal wave at a prescribed transmission angle.

10. The millimeter band signal transmitting/receiving system according to claim 9, wherein each of said prescribed distance and said prescribed transmission angle is determined depending on a region for propagation of said plurality of signal waves and a positional relationship between said transmitter and said receiver.

11. The millimeter band signal transmitting/receiving system of claim 1, wherein said receiver receives said signal wave through said line of sight propagation path when said line of sight propagation path is not blocked.

12. The millimeter band signal transmitting/receiving system of claim 1, wherein said receiver receives said signal wave only through said at least one indirect path when said line of sight propagation path is blocked.

13. The millimeter band signal transmitting/receiving system of claim 1, wherein said at least one indirect propagation path is formed in a main lobe of a transmit antenna.

14. The millimeter band signal transmitting/receiving system of claim 1, wherein said line of sight propagation path is formed in a side lobe of a transmit antenna.

15. The millimeter band signal transmitting/receiving system according to claim 1, wherein the intensity of the signal wave received from the indirect propagation path is substantially the same as the intensity of the signal wave received from the line of sight propagation path.

16. The millimeter band signal transmitting/receiving system according to claim 15, wherein the intensity of the signal wave received from the indirect propagation path is at least 3 dB greater than the intensity of the signal wave received from the line of sight propagation path.

17. The millimeter band signal transmitting/receiving system according to claim 1, wherein said stationary receiver receives a millimeter band signal wave having a carrier to noise ratio of at least 8 dB when said line of sight propagation path signal wave is interrupted.

18. The millimeter band signal transmitting/receiving system according to claim 1, wherein, when the millimeter band signal wave is received from the plurality of propagation paths, the line of sight propagation path and the at least one propagation path are received substantially without adverse effects caused by multiple paths.

19. A millimeter band signal transmitting/receiving system, comprising:

a plurality of stationary transmitters; and a stationary receiver including a receive antenna having a main lobe and a side lobe arranged to simultaneously receive a plurality of millimeter band signal waves output from said plurality of transmitters, said plurality of millimeter band signal waves being transmitted from said plurality of transmitters having a same frequency.

20. The millimeter band signal transmitting/receiving system according to claim 19, wherein each of said plurality of transmitters includes a local oscillator oscillating at a prescribed local oscillator frequency for generating said signal wave at said same frequency.

21. The millimeter band signal transmitting/receiving system according to claim 20, wherein said local oscillators are in synchronization with each other.

22. The millimeter band signal transmitting/receiving system according to claim 19, wherein said receiver always simultaneously receives said plurality of signal waves in a normal state.

23. The millimeter band signal transmitting/receiving system of claim 19, wherein said receiver receives one of said plurality of signal waves through at least one line of sight propagation path between at least one of said plurality of transmitters and said receiver.

24. A house provided with a millimeter band signal transmitting/receiving system including a structural component defining an internal space and a millimeter band signal transmitting/receiving system, wherein said millimeter band signal transmitting/receiving system comprises:

a stationary transmitter transmitting a millimeter band signal wave;

a propagation path forming portion arranged in said structural component for forming at least one indirect propagation path for propagation of said millimeter band signal wave; and a stationary receiver including a receive antenna having a main lobe and a side lobe arranged to simultaneously receive said millimeter band signal wave through a plurality of propagation paths including a line of sight propagation path to said transmitter and said at least one indirect propagation path.

25. The house provided with the millimeter band signal transmitting/receiving system according to claim 24, wherein said propagation path forming portion has a reflector reflecting an output from said transmitter and said reflector is arranged on a surface of said component.

26. The house provided with the millimeter band signal transmitting/receiving system according to claim 24, wherein said propagation path forming portion has a reflector reflecting an output from said transmitter and said reflector is arranged inside said component.

27. The house provided with a millimeter band signal transmitting/receiving system of claim 24, wherein said receiver receives one of said plurality of signal waves through said line of sight propagation path when said line of sight propagation path is not blocked.

28. The millimeter band signal transmitting/receiving system of claim 24, wherein said receiver only receives said plurality of signal waves through said at least one indirect propagation path when said line of sight propagation path is blocked.

29. The millimeter band signal transmitting/receiving system of claim 24, wherein said line of sight propagation path is formed in a side lobe of a transmit antenna.

30. The millimeter band signal transmitting/receiving system according to claim 24, wherein the intensity of the signal wave received from the at least one indirect propagation path is substantially the same as the intensity of the signal wave received from the line of sight propagation path.

31. The millimeter band signal transmitting/receiving system according to claim 30, wherein the intensity of the signal wave received from the it least one indirect propagation path is at least 3 dB greater than the intensity of the signal wave received from the line of sight propagation path.

32. The millimeter band signal transmitting/receiving system according to claim 24, wherein said stationary receiver receives a millimeter band signal wave having a carrier to noise ratio of at least 8 dB when said line of sight propagation path signal wave is interrupted.

33. The millimeter band signal transmitting/receiving system according to claim 24, wherein, when the millimeter band signal wave is received from the plurality of propagation paths, the line of sight propagation path and the at least one propagation path are received substantially without adverse effects caused by multiple paths.

34. A millimeter band signal transmitting/receiving system, comprising:

at least one stationary transmitter transmitting a millimeter band signal through an associated transmit antenna along a plurality of propagation paths of said millimeter band signal formed by said associated transmit antenna including a line of sight propagation path between said associated transmit antenna and a receive antenna;

a stationary receiver receiving the millimeter band signal through said receive antenna having a main lobe and a side lobe arranged to simultaneously receive said millimeter band signal from said transmitter, wherein, in a normal state when said line of sight propagation path is unobstructed, said receiver receives the millimeter band signal through each of the plurality of propagation paths including said line of sight propagation path, and wherein, in an obstructed state when said line of sight propagation path is obstructed, said receiver receives the millimeter band signal through each of the plurality of propagation paths except said line of sight propagation path.

35. The millimeter band signal transmitting/receiving system of claim 34, wherein at least a portion of said plurality of propagation paths are formed by at least one reflector.

36. The millimeter band signal transmitting/receiving system of claim 35, wherein said at least one reflector has a surface arranged substantially parallel to said line of sight propagation path.

37. The millimeter band signal transmitting/receiving system of claim 35, wherein said at least one reflector includes two reflectors.

38. The millimeter band signal transmitting/receiving system of claim 37, wherein at least one of said plurality of propagation paths of said signal is formed by reflection from each of said two reflectors.

39. The millimeter band signal transmitting/receiving system of claim 34, wherein said at least one transmitter is a single transmitter.

40. The millimeter band signal transmitting/receiving system of claim 34, wherein said at least one transmitter includes two transmitters and two associated transmit antennas, wherein each of said two associated transmit antennas provides a separate line of sight propagation path to said receive antenna.

41. The millimeter band signal transmitting/receiving system of claim 40, wherein said two transmitters are synchronized with each other.

42. The millimeter band signal transmitting/receiving system of claim 41, wherein said two transmitters share a common local oscillator.

43. The millimeter band signal transmitting/receiving system of claim 34, wherein said signal is a video signal.

44. The millimeter band signal transmitting/receiving system of claim 34, wherein said line of sight propagation path between said associated transmit antenna and the receive antenna is formed in a side lobe of said associated transmit antenna.

45. The millimeter band signal transmitting/receiving system of claim 34, wherein said plurality of propagation paths of said signal except said line of sight propagation path are formed in a main lobe of said associated transmit antenna.

46. The millimeter band signal transmitting/receiving system of claim 34, wherein a portion of said plurality of propagation paths are formed by interaction with a structural component of a building.

47. The millimeter band signal transmitting/receiving system of claim 34, wherein said receive antenna is a single receive antenna.

48. The millimeter band signal transmitting/receiving system of claim 34, wherein said receiver simultaneously receives the signal through each of an unobstructed plurality of propagation paths.

* * * * *